(12) United States Patent
Webber

(10) Patent No.: US 6,883,006 B2
(45) Date of Patent: Apr. 19, 2005

(54) ADDITIONS ON CIRCULAR SINGLY LINKED LISTS

(75) Inventor: Thomas Peter Webber, Petersham, MA (US)

(73) Assignee: Sun Microsystems, Inc., Santa Clara, CA (US)

(*) Notice: Subject to any disclaimer, the term of this patent is extended or adjusted under 35 U.S.C. 154(b) by 716 days.

(21) Appl. No.: 09/891,684

(22) Filed: Jun. 25, 2001

(65) Prior Publication Data

US 2002/0199030 A1 Dec. 26, 2002

(51) Int. Cl.$^7$ .................................................. G06F 17/30
(52) U.S. Cl. ..................................... 707/100; 707/205
(58) Field of Search ................................ 707/100, 205, 707/206

(56) References Cited

U.S. PATENT DOCUMENTS

| | | | | |
|---|---|---|---|---|
| 5,319,778 A | * | 6/1994 | Catino | 707/102 |
| 5,404,511 A | * | 4/1995 | Notarianni | 707/1 |
| 5,446,889 A | * | 8/1995 | Prestifilippo et al. | 707/100 |
| 5,765,175 A | * | 6/1998 | Needham et al. | 707/206 |
| 5,819,298 A | * | 10/1998 | Wong et al. | 707/205 |
| 6,671,690 B1 | * | 12/2003 | Webber et al. | 707/100 |
| 6,687,699 B1 | * | 2/2004 | Courey, Jr. | 707/10 |

* cited by examiner

*Primary Examiner*—Greta Robinson
(74) *Attorney, Agent, or Firm*—Beyer Weaver & Thomas, LLP

(57) ABSTRACT

During a scan operation in a circular, singly linked list having a number of list entries each of which has an associated next pointer field and a root pointer register that includes a root pointer that points to, or otherwise references, an arbitrary list entry. In order to add a new list entry to the list, the root pointer included in the root pointer register is copied into a next pointer field of the added list entry. Next, the root pointer register is overwritten with a pointer that points to or otherwise references the added list entry. In this way, additions to a circular, singly linked list that are done at the time of scanning involve only a single SRAM write access.

19 Claims, 9 Drawing Sheets

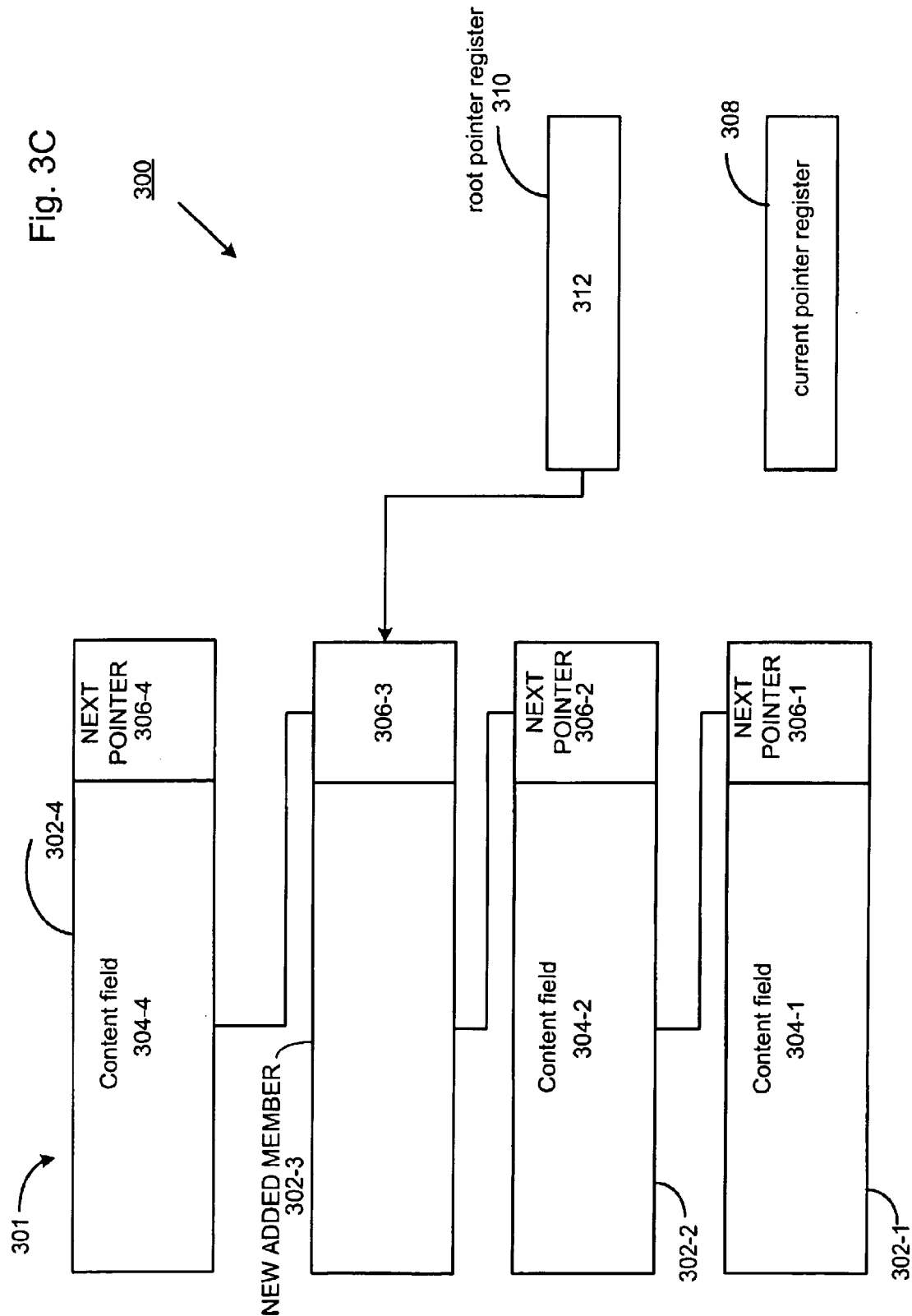

ADDITIONS ON CIRCULAR SINGLY LINKED LISTS

BACKGROUND OF THE INVENTION

1. Field of Invention

The present invention relates generally to methods, apparatus, and systems for manipulating data structures in a computing system. More particularly, the present invention relates to adding data on a circular, singly linked list.

2. Description of the Related Art

Linked lists are well known in the art, and various methods have been employed to manipulate linked lists. Linked lists are one of the most common data structures employed for the manipulation of data. Linked lists are particularly important with an operating system. Operating systems control a variety of resources simultaneously. A linked list might be used, for example, to hold requests for each individual resource. Circular linked lists can also be used in a server-client environment where the server uses the circular linked list to record those clients that are waiting for service at a particular time. By using the circular linked list, a server can insure that its attention is evenly distributed amongst the waiting clients by visiting and servicing each waiting client as it circulates around the list. Using a consumer/producer model to visualize the linked list, the server can be considered the consumer and the clients each representing a producer as illustrated in FIG. 1 that shows a linked list 100 representing individual work queues (WQ). As shown in FIG. 1, a producer adds work queues with new work to the list 100 as a consumer continually scans the list, processing packets from each work queue in turn and deletes a work queue when it's packets are spent. Using this arrangement, the list 100 contains all work queues that are pending where they remain so long as they still have work (or packets to transmit) until it is ultimately deleted when the work (or packet) has been depleted.

Generally, linked lists can take two forms: (1) circular singly linked lists; or (2) circular doubly linked lists. With a singly linked list, each member contains a field pointing to the next member while doubly linked lists add a second pointer to each member that points to the previous member. Although doubly linked lists facilitate scanning in the reverse direction, they are more difficult to maintain since the additional pointers require additional write operations to SRAM substantially increasing cycle time over singly linked lists.

Conventionally, additions to a linked list require at least 3 SRAM accesses an example of which is illustrated in FIGS. 2A–2C showing a conventional approach to adding a new member to a circular singly linked list 200 having a number of entries 201. Assuming, for example, that an entry 201-3 is to be added between an entry 201-2 and an entry 201-4. As shown, the entry 201-2 has a next pointer field 202-2 that points to the entry 201-4 which, in turn, has a next pointer field 202-4 which points to a next entry 201-1. During the conventional addition operation, (as shown in FIG. 2B) the contents of the next pointer field 202-2 are copied to a next pointer field 202-3 associated with the added entry 201-3 such that the entry 201-3 now points to the entry 201-4. Finally as shown in FIG. 2C, the next pointer field 202-2 (associated with the entry 201-2) is updated such that the entry 201-2 points to the added entry 201-3 thereby completing the addition operation. Since accesses to the same SRAM can not generally be parallelized, it is important for performance reasons to keep the number of reads and writes to memory at a minimum. Although registers can be accessed in parallel they do not have the density of SRAM.

Unfortunately, however, the conventional approach to adding entries to a circular singly linked list is wasteful of memory resources since the accesses to the SRAM cannot be parallelized using a single SRAM and adding additional SRAM resources is costly and inefficient.

Therefore, what is desired is a method, apparatus, and system for efficiently adding a entry in an arbitrary (i.e., unspecified) location in a circular singly linked list.

SUMMARY OF THE INVENTION

Methods and apparatus for augmenting a scan operation of a circular singly linked list by providing a method, apparatus, and system for adding a member of a circular singly linked list using a single SRAM write access is described. During a scan operation in a circular, singly linked list having a number of list entries each of which has an associated next pointer field and a root pointer register that includes a root pointer that points to, or otherwise references, an arbitrary list entry. In order to add a new list entry to the list, the root pointer included in the root pointer register is copied into a next pointer field of the added list entry. Next, the root pointer register is overwritten with a pointer that points to or otherwise references the added list entry. In this way, additions to a circular, singly linked list that are done at the time of scanning involve only a single SRAM write access.

In a particular embodiment of the invention, the root pointer register points to a most recently added list entry.

In another embodiment, an apparatus for adding a current member of a circular, singly linked list is described requiring only a single memory write operation.

In yet another embodiment, a computer program product for adding a current member of a circular, singly linked list is described.

These and other advantages of the present invention will become apparent upon reading the following detailed descriptions and studying the various figures of the drawings.

BRIEF DESCRIPTION OF THE DRAWINGS

The invention may best be understood by reference to the following description taken in conjunction with the accompanying drawings.

FIGS. 3A–3C shows an exemplary circular, singly linked list in which a new member is added in accordance with an embodiment of the invention.

DETAILED DESCRIPTION OF THE EMBODIMENTS

Reference will now be made in detail to a preferred embodiment of the invention. An example of the preferred embodiment is illustrated in the accompanying drawings. While the invention will be described in conjunction with a preferred embodiment, it will be understood that it is not intended to limit the invention to one preferred embodiment. To the contrary, it is intended to cover alternatives, modifications, and equivalents as may be included within the spirit and scope of the invention as defined by the appended claims.

During a scan operation in a circular, singly linked list having a number of list entries each of which has an associated next pointer field and a root pointer register that includes a root pointer that points to, or otherwise references, an arbitrary list entry. In order to add a new list entry to the circular, singly linked list, the root pointer included in the root pointer register is copied into a next pointer field associated with the added list entry. Next, the root pointer register is overwritten with a pointer that points to or otherwise references the added list entry. In this way, additions done at the time of scanning involve only a single SRAM write access.

As currently described, the invention uses a root pointer register to facilitate additions to a circular singly linked list. Using the root pointer, linked list additions can be performed using a single SRAM access when the location of the added member is arbitrary. In the described embodiment, the root pointer points to, or otherwise references, an arbitrary location in the list for the site of the next addition. However, in order to make the list circular, the last member of the list has a link to the root pointer register. In a preferred embodiment, a NULL value is used as the next pointer of the last member. In so doing, a scan operation must recognize that the NULL value is a special marker indicating that in order to obtain the location of the next member of the list, the root pointer must be used when the NULL value is returned from a read of the list.

The invention will now be described in terms of a circular, singly linked list where each member of the list includes both a content field for storing data as well as a next pointer field. It should be noted, however, that the invention is equally well suited for applications where some, if not all of the members of the circular, singly linked list include only a next pointer field.

It should be noted that a consumer scans a list by following a next pointer that is embedded in each member that points to a next member in the list and copying the next pointer into a current pointer register. The current pointer register is used as address as the next member is read. When the next member is read, its next pointer field is copied into the current pointer register and by repeating the process, every member in the circular, singly linked list can be scanned.

Figure 1:
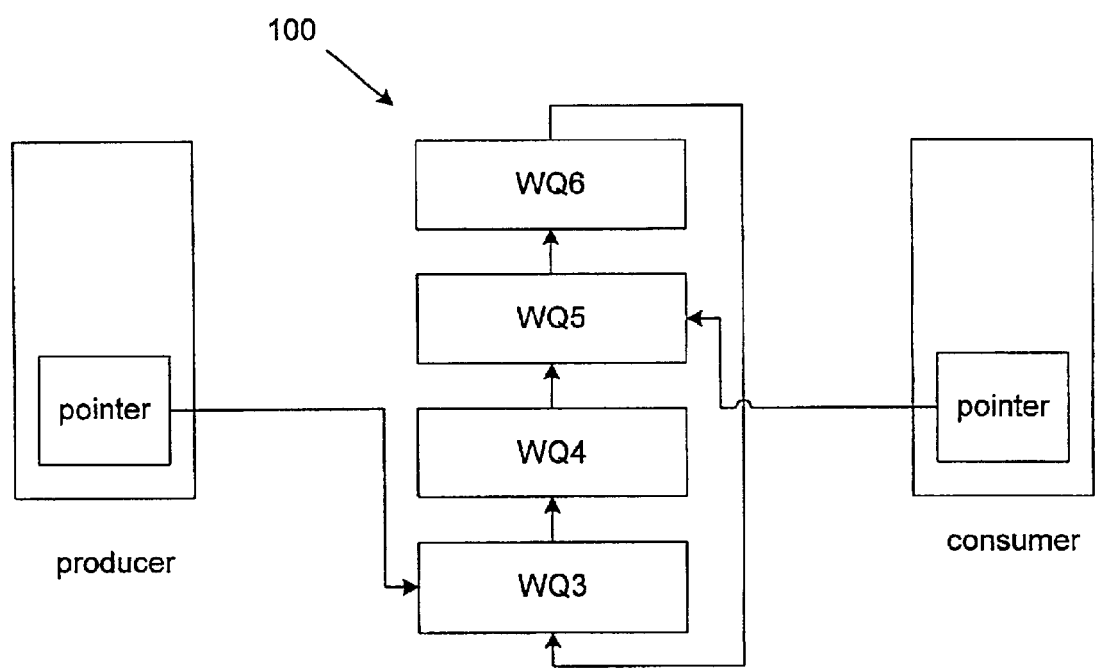
FIG. 1 is a diagrammatic representation of a conventional circular singly linked list.
Figure 2A:
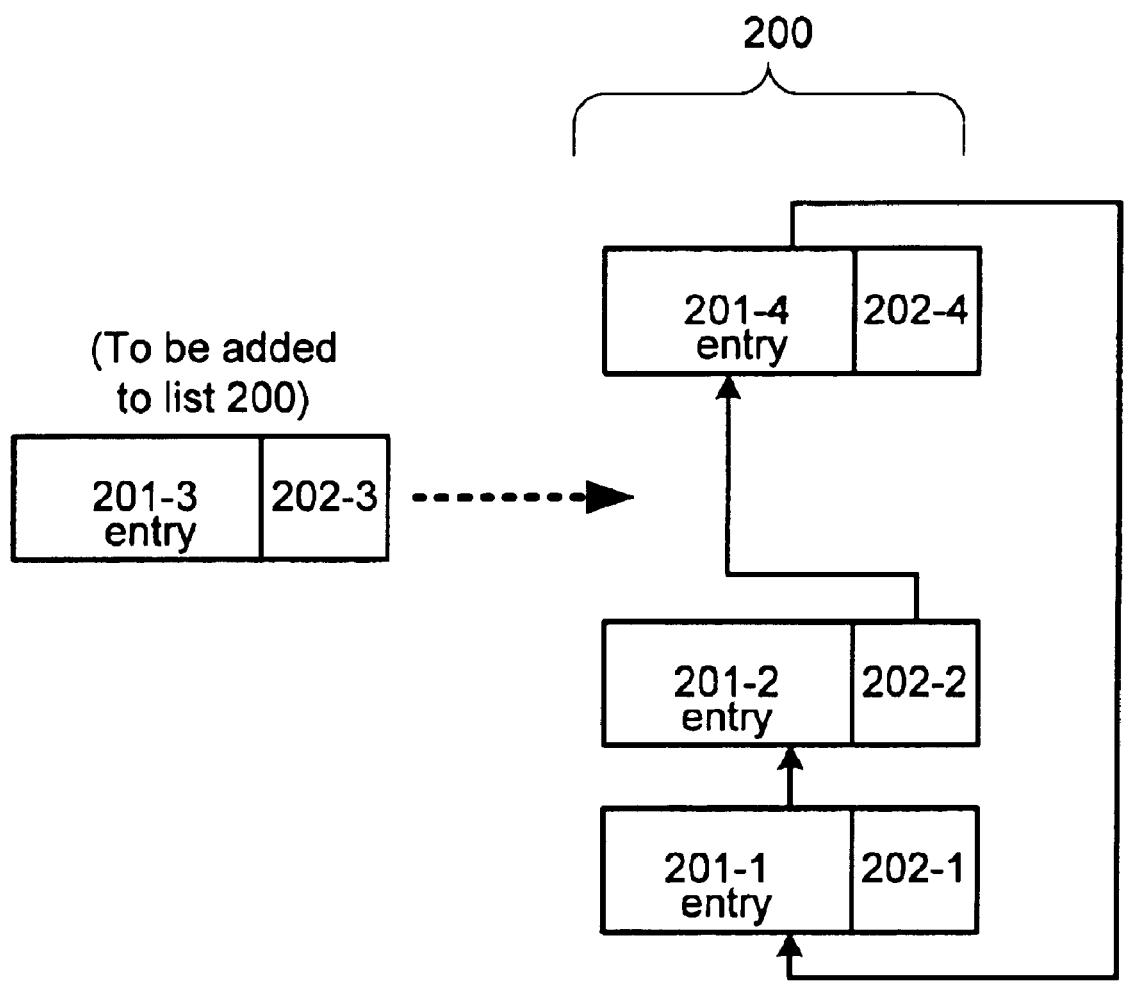
FIGS. 2A–2C illustrate a conventional addition operation in a circular singly linked list.
Figure 2B:
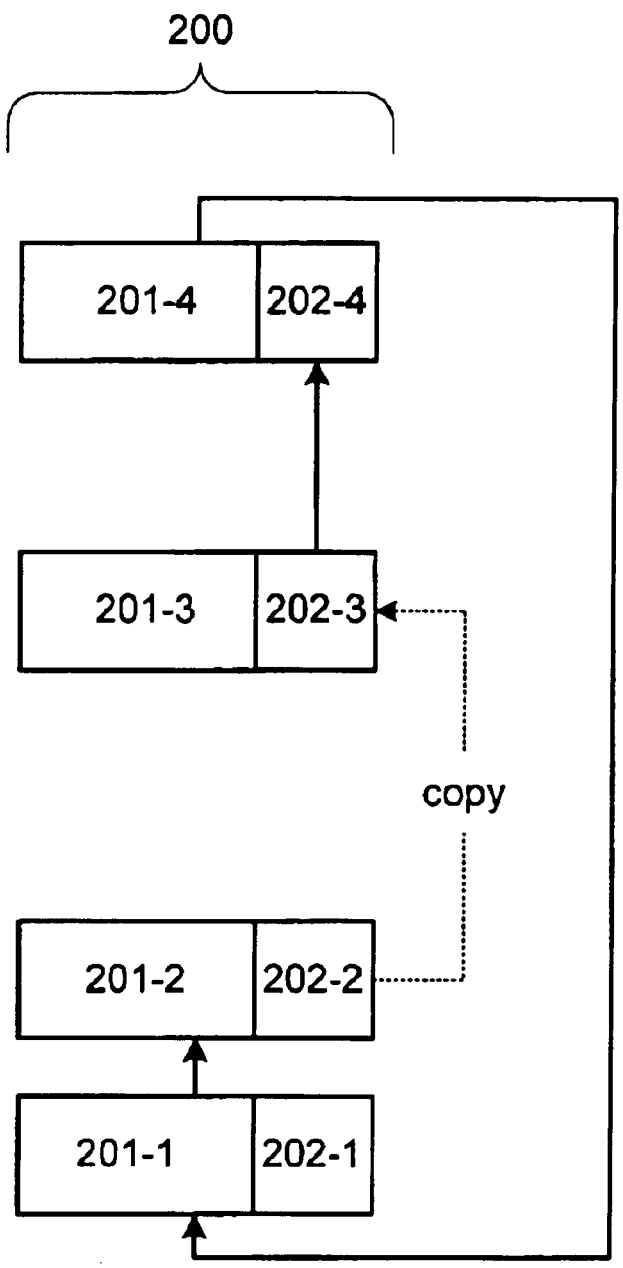
Figure 2C:
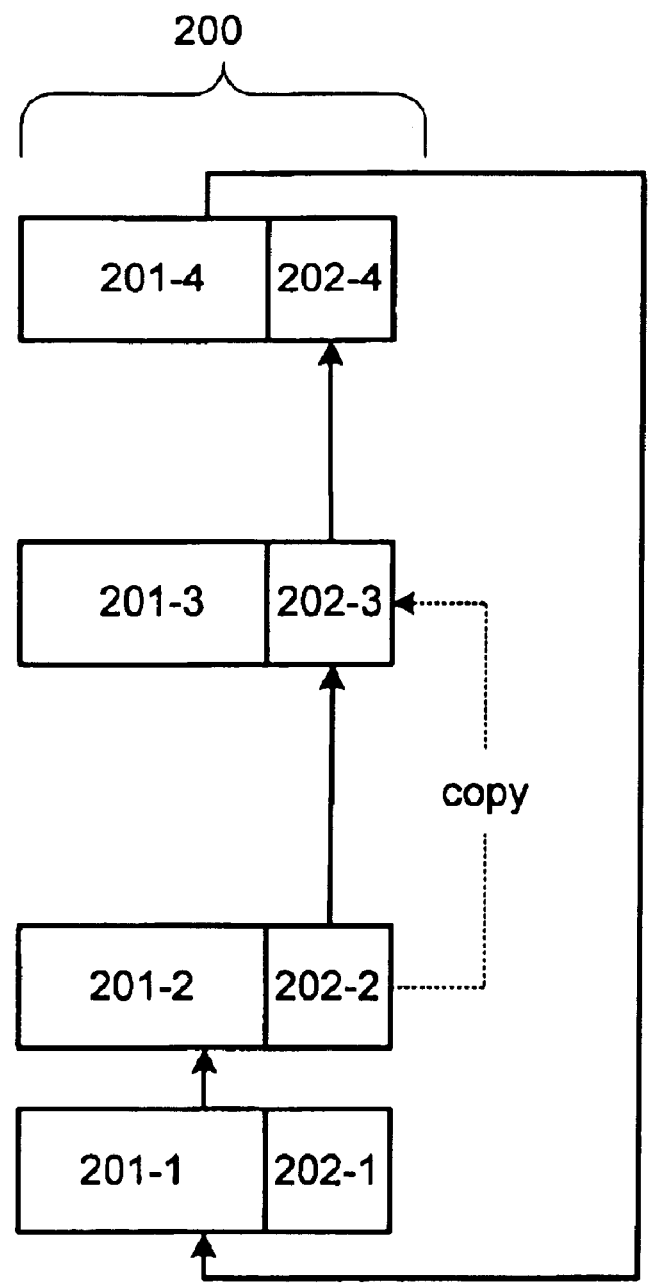
Figure 3A:
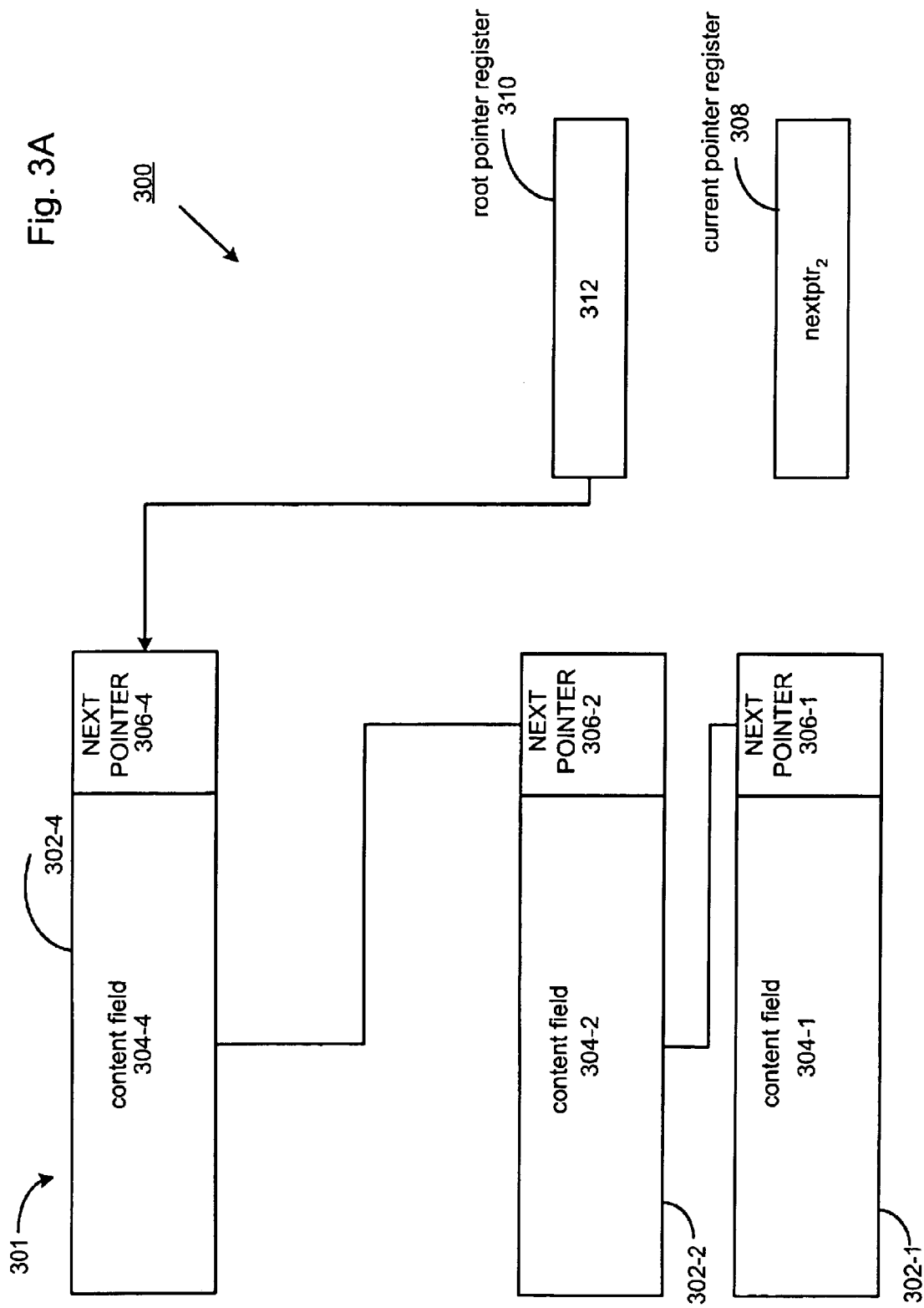
Figure 3B:
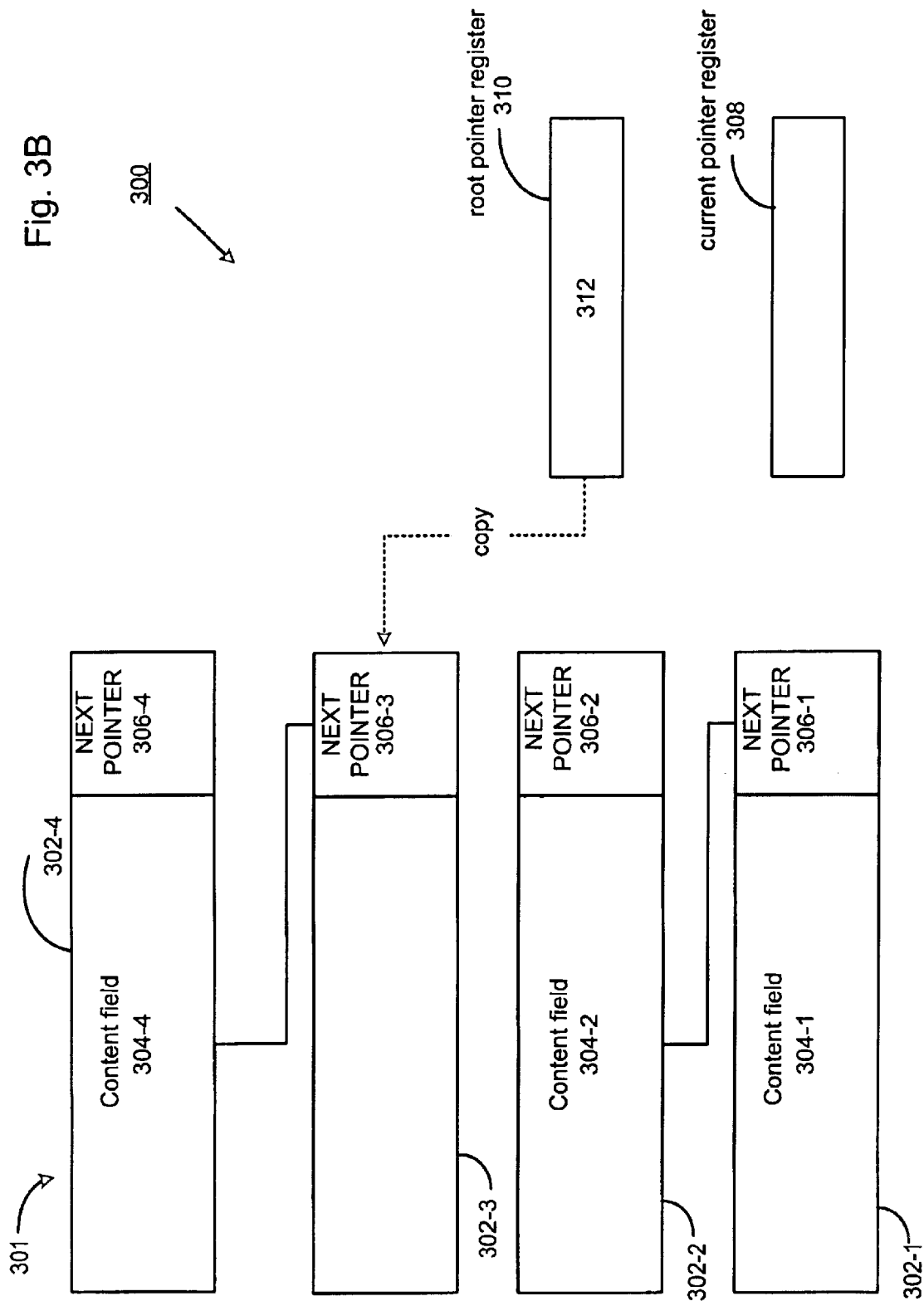

FIGS. 3A–3C illustrates a system 300 for performing an exemplary addition operation in a circular singly linked list 301 in accordance with an embodiment of the invention. As shown in FIG. 3A, the circular singly linked list 301 is formed of a number of work queues (WQ) 302, also referred to as members, each of which is formed of a content (or data) field 304 and a next pointer field 306. For example, the member 302-1 includes a content field 304-1 and an associated next pointer field 306-1 that points to, or otherwise, references the next member of list 301, which in this case is the member 302-2, and so on. The system 300 also includes a current pointer register 308 into which is stored a next pointer associated with a current member of the list 301.

Using the consumer/producer paradigm as described above, each time the consumer scans a current member on the list, the consumer copies the contents of the scanned member's next pointer field into the current pointer register and locates the next member of the list to be scanned using the content of current pointer register. Using the list 301 as an example, when the consumer scans the member 302-1, the consumer copies the contents of the next pointer field 306-1 (i.e., "nextptr$_2$") to the current pointer register 308 that is used, in turn, to locate the next member in the linked list 301 to be scanned, namely member 302-2, and so on.

Associated with the list 301 is a root pointer register 310 having a root pointer 312 that points to, or otherwise references, for this example, the member 302-4. As shown in FIG. 3B, in order to add a new member 302-3, for example, to the list 301, the root pointer 312 is copied to a next pointer field 306-3 associated with the new member 302-3. (It should be noted that this copy operation is the single SRAM write) In this way, the next pointer field 306-3 points to the member 302-4. Next, as shown in FIG. 3C, the root pointer register 310 is updated such that the root pointer 312 points to the new added member 302-3, which, in turn, points to the member 302-4.

It should also be noted, that in this example, the relative positions of the various entries in the list 301 are irrelevant since any new entry can be added in an arbitrary location in the list 301. Therefore, the description above is for illustrative purposes only and should not be construed as limiting either the scope or intent of the invention.

It should be noted that in a preferred embodiment of the invention, the root pointer register is essentially included as a member of the list which is accommodated by marking a last member of the list as a NULL member (by, for example, storing a NULL value therein) to indicate that the next member in the list is the member pointed to by the root pointer. Therefore, during a scan operation, when a consumer reaches the last member of the list and reads the NULL value, the consumer must use the root pointer to locate the next member of the list being scanned instead of the member's next pointer. It should also be noted that this does not require an additional SRAM access.

Figure 4:
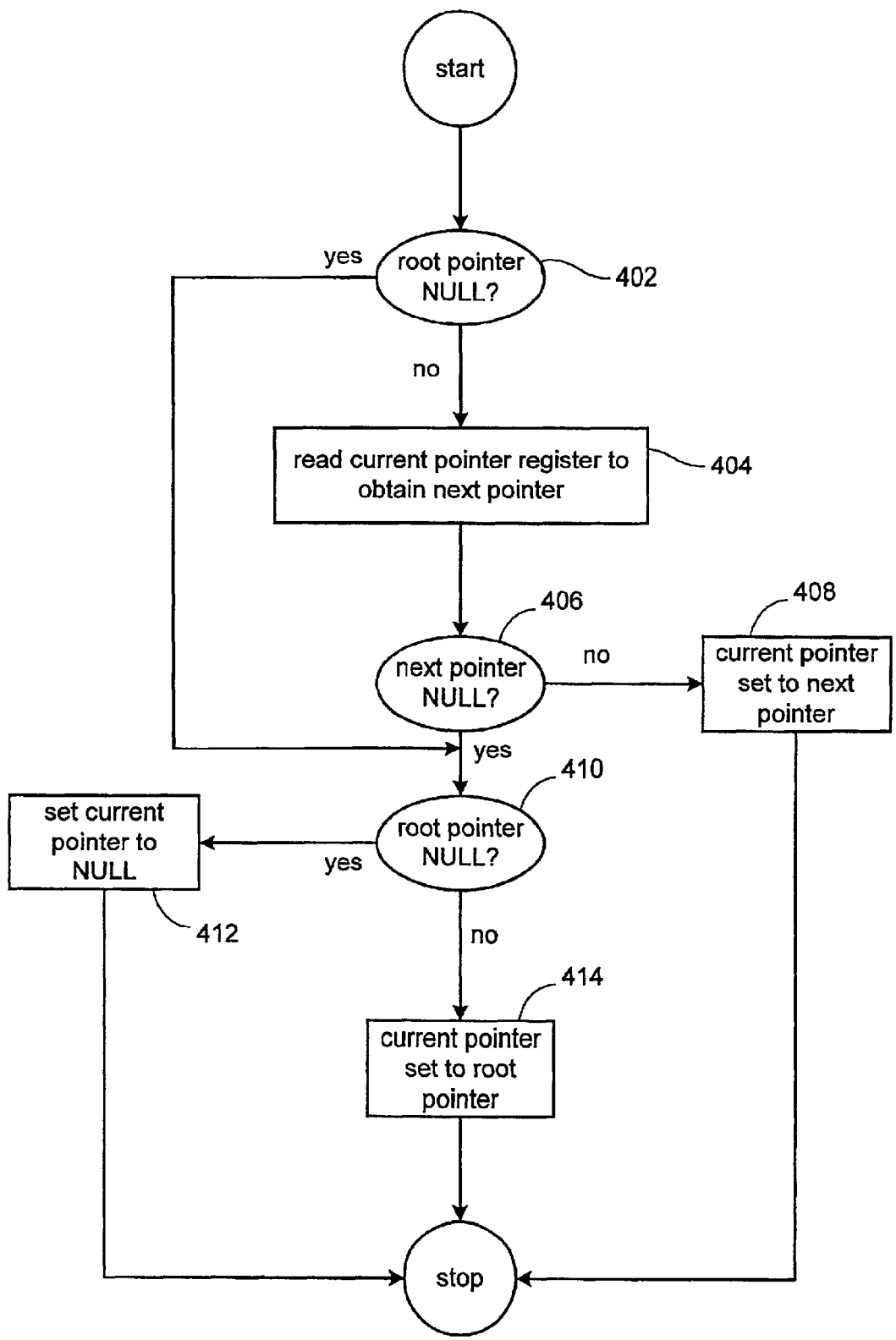
FIG. 4 illustrates a flowchart describing a process for adding a member to a circular, singly linked list in accordance with an embodiment of the invention.

FIG. 4 illustrates a flowchart describing a scan process 400 in accordance with an embodiment of the invention. The process 400 begins at 402 by determining if a root pointer is a NULL value. If the root pointer is not a NULL value, a next pointer is obtained at 404 by reading a current pointer. Next, if at 406 it is determined that the next pointer is not a NULL value, then at 408 the current pointer is set to the next pointer and the process 400 is done. If, however, the next pointer is determined to be the NULL value, then at 410 a determination is made if a root pointer is a NULL value. If the root pointer is determined to be the NULL value, then the list is empty and the current pointer is set to the NULL value at 412 and the process 400 is done. If, however, the root pointer is determined to not be the NULL value, then the current pointer is set to the value of the root pointer at 414. Returning to 402, it had been determined that the root pointer is a NULL value, then control is passed directly to 410.

Figure 5:
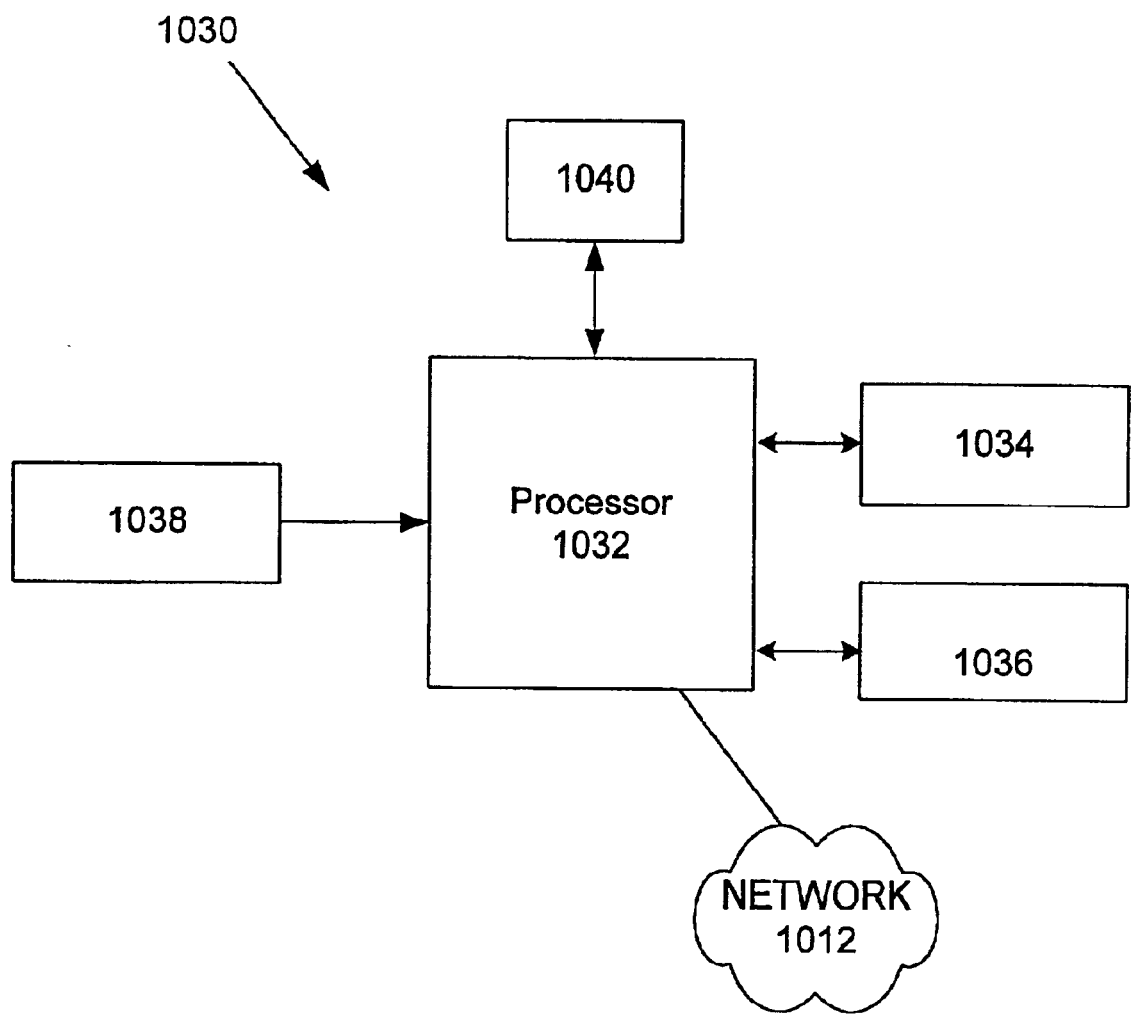
FIG. 5 is a diagrammatic representation of a general-purpose computer system suitable for implementing the present invention.

FIG. 5 illustrates a typical, general-purpose computer system suitable for implementing the present invention. The computer system 1030 includes at least one processor 1032 (also referred to as a central processing unit, or CPU) that is coupled to memory devices including primary storage devices 1036 (typically a read only memory, or ROM) and primary storage devices 1034 (typically a random access memory, or RAM).

Computer system 1030 or, more specifically, CPUs 1032, may be arranged to support a virtual machine, as will be appreciated by those skilled in the art. As is well known in the art, ROM acts to transfer data and instructions unidirectionally to the CPUs 1032, while RAM is used typically to transfer data and instructions in a bi-directional manner. CPUs 1032 may generally include any number of processors. Both primary storage devices 1034, 1036 may include any suitable computer-readable media. A secondary storage medium 1038, which is typically a mass memory device, is also coupled bi-directionally to CPUs 1032 and provides additional data storage capacity. The mass memory device 1038 is a computer-readable medium that may be used to store programs including computer code, data, and the like. Typically, mass memory device 1038 is a storage medium such as a hard disk or a tape which generally slower than primary storage devices 1034, 1036. Mass memory storage device 1038 may take the form of a magnetic or paper tape reader or some other well-known device. It will be appreciated that the information retained within the mass memory device 1038, may, in appropriate cases, be incorporated in standard fashion as part of RAM 1036 as virtual memory. A specific primary storage device 1034 such as a CD-ROM may also pass data uni-directionally to the CPUs 1032.

CPUs 1032 are also coupled to one or more input/output devices 1040 that may include, but are not limited to, devices such as video monitors, track balls, mice, keyboards, microphones, touch-sensitive displays, transducer card readers, magnetic or paper tape readers, tablets, styluses, voice or handwriting recognizers, or other well-known input devices such as, of course, other computers. Finally, CPUs 1032 optionally may be coupled to a computer or telecommunications network, e.g., an internet network or an intranet network, using a network connection as shown generally at 1012. With such a network connection, it is contemplated that the CPUs 1032 might receive information from the network, or might output information to the network in the course of performing the above-described method steps. Such information, which is often represented as a sequence of instructions to be executed using CPUs 1032, may be received from and outputted to the network, for example, in the form of a computer data signal embodied in a carrier wave. The above-described devices and materials will be familiar to those of skill in the computer hardware and software arts.

It should be noted that the present examples are to be considered as illustrative and not restrictive, and the invention is not to be limited to the details given herein, but may be modified within the scope of the appended claims.

What is claimed is:

1. In a circular singly linked list having a first member having a first member next pointer field, a current pointer register and a root pointer register, a method for adding a new member to the list at an arbitrary location during a scan operation, comprising:

copying a root pointer included in the root pointer register to a new member next pointer field associated with the new member such that the new member next pointer field points to the first member; and overwriting the root pointer register with a new member root pointer such that the root pointer register points to the new member.

2. A method as recited in claim 1, wherein the first member includes a first content field suitable for storing a data field.

3. A method as recited in claim 2, wherein the data field stored in the current content field is read by a consumer during a list scan operation.

4. A method as recited in claim 1, wherein the addition requires only a single memory access operation.

5. A method as recited in claim 1, further comprising:

once the new member has been added to the list, if the root pointer is not NULL, then reading the current pointer register to obtain the next pointer;

if the next pointer is not NULL, the setting a current pointer to the next pointer.

6. A method as recited in claim 5, further comprising:

if the current pointer is NULL, and if the root pointer is NULL, then setting the list as an empty list, if the root pointer is not NULL, then setting the current pointer to the root pointer.

7. A method as recited in claim 5, if the next pointer is NULL, then if the root pointer is NULL, then setting the list as an empty list, if the root pointer is not NULL, then setting the current pointer to the root pointer.

8. In a circular singly linked list having a first member having a first member next pointer field, a current pointer register and a root pointer register, an apparatus for adding a new member to the list at an arbitrary location during a scan operation, comprising:

a means for copying a root pointer included in the root pointer register to a new member next pointer field associated with the new member such that the new member next pointer field points to the first member; and a means for overwriting the root pointer register with a new member root pointer such that the root pointer register points to the new member.

9. An apparatus as recited in claim 8, wherein the first member includes a first content field suitable for storing a data field.

10. An apparatus as recited in claim 9, wherein the data field stored in the current content field is read by a consumer during a list scan operation.

11. An apparatus as recited in claim 8, wherein the addition requires only a single memory access operation.

12. An apparatus as recited in claim 8, further comprising:

a means for determining if a current pointer is not NULL;

a means for reading the current pointer register to obtain the next pointer when the current pointer is not NULL;

a means for determining if the next pointer is not NULL; and a means for setting the current pointer to the next pointer.

13. An apparatus as recited in claim 12, further comprising:

a means for determining if the current pointer is NULL;

a means for determining if the root pointer is NULL;

a means for setting the list as an empty list when the current pointer and the root pointer are NULL; and a means for setting the current pointer to the root pointer when the root pointer is not NULL.

14. An apparatus as recited in claim 12, further comprising:

a means for determining if the next pointer is NULL;

a means for setting the List as an empty list when the root pointer is NULL; and a means for setting the current pointer to the root pointer when the root pointer is not NULL.

15. A computer program product for adding a new member to the list at an arbitrary location during a scan operation in a circular singly linked list having a first member having a first member next pointer field, a current pointer register and a root pointer register, comprising:

computer code for copying a root pointer included in the root pointer register to a new member next pointer field associated with the new member such that the new member next pointer field points to the first member; and computer code for overwriting the root pointer register with a new member root pointer such that the root pointer register points to the new member; and a computer-readable medium that stores the computer codes.

16. A computer program product as recited in claim 15, wherein the first member includes a first content field suitable for storing a data field.

17. A computer program product as recited in claim 16, wherein the data field stored in the current content field is read by a consumer during a list scan operation.

18. A computer program product as recited in claim 15, wherein the addition requires only a single memory access operation.

19. An apparatus as recited in claim 18, further comprising:

computer code for determining if a current pointer is not NULL;

computer code for reading the current pointer register to obtain the next pointer when the current pointer is not NULL;

computer code for determining if the next pointer is not NULL;

computer code for setting the current pointer to the next pointer;

computer code for determining if the current pointer is NULL;

computer code for determining if the root pointer is NULL;

computer code for setting the list as an empty list when the current pointer and the root pointer are NULL;

computer code for setting the current pointer to the root pointer when the root pointer is not NULL;

computer code for determining if the next pointer is NULL;

computer code for setting the list as an empty list when the root pointer is NULL; and computer code for setting the current pointer to the root pointer when the root pointer is not NULL.

* * * * *